United States Patent
Spindler et al.

(10) Patent No.: US 7,612,150 B2
(45) Date of Patent: Nov. 3, 2009

(54) POLYAMIDE-BASED WATER-SOLUBLE BIODEGRADABLE COPOLYMERS AND THE USE THEREOF

(75) Inventors: Christian Spindler, Wasserburg (DE); Johann Plank, Trostberg (DE)

(73) Assignee: BASF Construction Polymers GmbH, Trostberg (DE)

( * ) Notice: Subject to any disclaimer, the term of this patent is extended or adjusted under 35 U.S.C. 154(b) by 274 days.

(21) Appl. No.: 10/536,596

(22) PCT Filed: Dec. 11, 2003

(86) PCT No.: PCT/EP03/14088

§ 371 (c)(1), (2), (4) Date: May 26, 2005

(87) PCT Pub. No.: WO2004/052960

PCT Pub. Date: Jun. 24, 2004

(65) Prior Publication Data

US 2006/0074201 A1    Apr. 6, 2006

(30) Foreign Application Priority Data

Dec. 11, 2002 (DE) ............................... 102 57 701
Mar. 31, 2003 (DE) ............................... 103 14 354

(51) Int. Cl.
*C08L 77/04* (2006.01)

(52) U.S. Cl. ...................................... 525/420; 525/427

(58) Field of Classification Search ................. 525/420, 525/427
See application file for complete search history.

(56) References Cited

U.S. PATENT DOCUMENTS

2002/0005287 A1    1/2002    Reddy et al.

FOREIGN PATENT DOCUMENTS

| DE | 10 03 444 B | 2/1957 |
| DE | 44 21 722 A | 1/1996 |
| DE | 44 30 362 A | 2/1996 |

*Primary Examiner*—Ana L Woodward
(74) *Attorney, Agent, or Firm*—Fulbright & Jaworski L.L.P.

(57) ABSTRACT

Water-soluble, biologically degradable copolymers based on polyamide are described which contain at least one grafted side chain composed of aldehydes and sulfur-containing acids and salts thereof and optionally at least one compound from the series ketones, aromatic alcohols, urea (derivatives) and amino-s-triazines. Natural polyamides such as caseins, gelatins, collagens, bone glues, blood albumins and soya proteins as well as degradation products thereof and synthetic polyamides such as polyaspartic acids and copolymers of aspartic and glutamic acid are used as preferred polyamide components. These copolymers are obtained primarily by graft polymerization at temperatures between −10 and 250° C., preferably in the presence of a solvent such as water or by thermal drying and they are used in particular as flow agents or water retention agents for inorganic binders and pigments especially in combination with hydraulic binders they only have a very slight setting-retardant effect.

23 Claims, No Drawings

POLYAMIDE-BASED WATER-SOLUBLE BIODEGRADABLE COPOLYMERS AND THE USE THEREOF

This is a §371 of PCT/EP2003/014088 filed Dec. 11, 2003, which claims priority from German Patent Application No. 102 57 701.3 filed Dec. 11, 2002 and German Patent Application No. 103 14 354.8 filed Mar. 31, 2003.

The present invention concerns water-soluble, biodegradable copolymers based on polyamide and the use thereof.

Polycondensation products per se and in particular their use in the field of construction chemicals are sufficiently well known in the prior art.

Thus polycondensates are used as so-called high performance flow agents. These include sulfonated aminoplast-formers, sulfonated naphthalene- and phenol-formaldehyde resins and sulfonated acetone-formaldehyde resins.

The patents DE 1 671 017 and DE 195 38 821 describe sulfonated polycondensation products of amino-s-triazines and formaldehyde; condensation products of triazines and glyoxylic acid are known from U.S. Pat. No. 5,891,983. Polycondensation products of naphthalene sulfonic acids with formaldehyde are described in the patent documents U.S. Pat. No. 2,141,569, DE 2 007 603 and EP 214 412. High-performance flow agents which are obtained by reacting ketones with aldehydes have been previously described in U.S. Pat. No. 4,585,853.

Aqueous suspensions of inorganic powders such as clays, silicates or inorganic binders are often admixed in practice with additives for certain applications. The flow agent group is used in this case to improve the working properties of the suspensions to which they have been added. These additives are usually (poly)-electrolytes which influence the rheological behaviour of the suspensions under shearing conditions:

The individual particles of the suspended material for example have simultaneously positive and negative surface charges as a result of which attractive coulombic forces act between the particles which leads to the formation of agglomerates and considerably increases the viscosity of the suspension. Due to their structure, the described additives adsorb to the surfaces of the suspended material. In doing so the polymeric additives neutralize either the positive or the negative component of the surface charge such that the individual solid particles in the suspension electro-statically repel one another. This prevents the formation of agglomerates and existing agglomerates are broken up. Hence the viscosity of the suspension is considerably reduced. In applications for construction chemicals the described effect is used especially to produce cement suspensions.

Many other suspended substances such as calcium sulfate binders, calcium carbonate or various pigments have only positive or only negative surface charges. In this case the electrolytic repulsion is increased by the adsorption of polyelectrolytes to the particle surfaces.

In order to produce suspensions of hydraulic binders that can be easily processed it is usually necessary to use considerably more water than would be required to chemically set the clinker. The excess water evaporates after the setting and leads to a considerably less compact, hydrated phase which in turn results in a considerably reduced strength of the hardened phase. By using flow agents it is possible to reduce the amount of water required while the working properties remain unchanged. This results in considerably improved compressive strengths of the hardened phases.

It is known that many of the polycondensates described in the prior art are usually not biologically degradable. Hence these compounds can accumulate in the environment and contribute to soil or water contamination.

This is particularly relevant when cement slurries for example come into contact with drinking water or agricultural areas under cultivation. In this connection particular mention should be made to the use of flow agents in the exploration and production of crude oil or natural gas on the high seas i.e. in so-called off-shore areas. Flow agents are used here for cementitious systems to construct drilling platforms and to cement bore holes. The flow agents that are used can in the former case be washed out by sea water and in the latter case pass from the cement slurries into water-bearing formation layers. That is why preference should be given to biodegradable products for applications in a marine environment according to the "Convention for the Protection of the Marine Environment of the North-East Atlantic" (OSPAR Convention).

Some biodegradable flow agents for cement slurries have already been described in the prior art such as in U.S. Pat. No. 6,019,835 which discloses modified ligno-sulfonates as biodegradable flow agents. The already published US application 2002/0005287 describes polyaspartic acid as a biodegradable high-performance flow agent.

Although these flow agents are biologically degradable, they usually have the major disadvantage that they have a retarding effect on the setting characteristics of cement slurries.

Hence the object of the present invention was to provide water-soluble and biologically degradable copolymers based on polyamide which can be used as high-performance flow agents and in doing so hardly retard the hydraulic setting of the clinker.

This object was achieved with appropriate copolymers which contain at least one grafted side chain composed of aldehydes and sulfur-containing acids or salts thereof.

It was surprisingly found that the copolymers according to the invention can not only be used as flow agents in the high-performance field in accordance with their intended function and generally have a less pronounced retarding action, but that they also exhibit their advantageous properties under extreme conditions such as high temperatures, high pressures and high salt concentrations which was not to be expected.

Moreover, it was completely unexpectedly found that the copolymers according to the invention are also suitable as water retention agents. Water retention agents are used to prevent water from escaping from slurries of inorganic or organic binders or pigments. The water loss is usually due to capillary forces that emanate from porous substrates. Water retention agents can either bind water as a result of their chemical structure or promote the formation of a thick filter cake on the substrate.

Water retention binding agents are for example used for this purpose in plasters, tile cements, jointing mortars, knife fillers and self-levelling compounds as well as deep-well cement slurries. In addition they are also used among others in aqueous clay suspensions which can for example serve as drilling fluids. A number of compounds having such properties are known from the prior art. Thus EP-A 1090 889 describes mixtures of clay and guar as water retention agents. DE-OS 195 43 304 and U.S. Pat. No. 5,372,642 disclose cellulose derivatives as water retention agents, EP-A 116 671, EP-A 483 638 and EP-A 653 547 disclose synthetic polymers that contain acrylamido-substituted sulfonic acids as comonomers. However, all the described polymers are either not biologically degradable or they are unstable at high temperatures. In contrast the copolymers according to the invention are bio-degradable and they degrade at high temperatures to a considerably lesser extent.

Copolymers are regarded as preferred within the scope of the present invention which contain the polyamide component in proportions of 5 to 80% by weight and preferably of 10 to 60% by weight, the aldehyde component in proportions of 5 to 90% by weight and preferably of 10 to 70% by weight and the sulfur-containing acidic component in proportions of 5 to 60% by weight and preferably of 15 to 40% by weight.

It has proven to be particularly advantageous when the new copolymers have natural polyamides especially in the form of caseins, gelatins, collagens, bone glues, blood albumins and soya proteins, synthetic polyamides and here in particular polyaspartic acids or copolymers of aspartic and glutamic acid as the polyamide component. The invention also encompasses polyamide components which have been derived from the above-mentioned polyamides by oxidation, hydrolysis or depolymerization e.g. by enzymatic degradation as well as any mixtures of the said members.

The side chains grafted onto the copolymers are regarded as an essential feature of the invention whereby grafted aldehydes based on paraformaldehyde, paraldehyde and/or unbranched non-aromatic aldehydes preferably with 1 to 5 C atoms and in particular formaldehyde, acetaldehyde and glyoxal are preferred. Inorganic sulfur salts such as those of sulfurous or disulfuric acid hence for example sulfites, hydrogen sulfites and disulfites of alkali (earth) metals, of aluminium, iron and ammonium are the preferred basis for the grafted sulfur-containing acids or salts thereof. Naphthalene- and benzenesulfonic acids are preferred as organic sulfonic acids.

If inorganic sulfur-containing acids or salts thereof are used to synthesize the polymers, preferably at least one additional compound is used in the case of the water-soluble and biologically degradable polyamide-based copolymers according to the invention to build the side chain(s).

In this case ketones and in particular those based on non-aromatic ketones and especially 2-propanone, 2-butanone or pyruvic acid come into consideration as additional grafted compounds. However, grafted aromatic alcohols based on phenols, cresols, catechols or resorcins and aminoplast formers in particular dicyandiamide, amino-s-triazines and urea (derivatives) have also proven to be suitable for copolymers according to the invention. Particularly suitable amino-s-triazines are those based on melamine (derivatives) and particularly preferably those based on melamine.

These additional compounds should be present in the copolymer side chains preferably in proportions of 5 to 85% by weight and especially in proportions of 10 to 70% by weight.

Within the scope of the present invention especially copolymers that have been produced by a special process have also proven to be particularly advantageous:

In this process a graft polymerization is carried out preferably at temperatures between −10 and 250° C. and in particular between 0 and 130° C. in each case preferably in the presence of a solvent and in particular in the presence of a polar solvent such as water or dimethylsulfoxide.

However, the invention also takes into consideration the formation of graft polymers by thermal treatment such as by co-drying the polyamide and the polymer to be grafted.

Copolymers for which water or other polar solvents can be used to build their side chains from the individual building blocks (grafting from) are especially suitable. Polymers having higher molar masses can be thereby obtained if either the process is carried out without water or water is separated by distillation during the reaction.

In addition to the modification of the polyamide in solution it is also possible to carry out a bulk grafting. Polymers having a relatively high molar mass are also obtained with this variant. If the aldehydes that are to be grafted onto the polyamide are soluble in solvents that are immiscible with water, the graft polymers can be synthesized by interfacial condensation: for this purpose soya protein isolate is for example dissolved in the aqueous phase and the low molecular weight compounds that are to be grafted are dissolved in an organic phase. Vigorous intermixing of the two phases (e.g. by a Turax stirrer) allows the polycondensation to take place at the interface between the aqueous and organic phase.

However, the grafted copolymers according to the invention can also be synthesized by covalently linking the condensational addition products to the polyamide backbone (grafting onto) which can also be carried out by reaction in solution or in bulk. In this case water or dimethylsulfoxide are again preferred as solvents.

In addition to the described methods for covalently linking the polymers in solution or in bulk, the copolymers can also be generated according to the invention during thermal co-drying of a solution which contains both polymers. In this case water comes primarily into consideration as the solvent. The drying process is best carried out by spray-drying or drum-drying.

All grafting reactions should be carried out in a temperature range between −10° C. and 250° C. If it is carried out in solution, a temperature range between 0° C. and 130° C. is preferred. The procedure can be carried out at normal pressure but also at an increased pressure.

In addition to the grafted copolymers themselves and the preferably produced variants thereof, the present invention also claims their use as flow agents for inorganic binders and pigments and in particular as flow agents for hydraulic binders. In this connection it should again be mentioned that the copolymers according to the invention are primarily characterized by the fact that they only have a low tendency to delay setting. Thus for example it has turned out that the copolymers used as flow agents result in a considerably reduced setting time for cement slurries compared to polyaspartic acid.

In addition the present invention also claims the use of the polymers according to the invention as water retention agents. Also in this case the short setting time that can be achieved with polymers according to the invention is an advantage.

Overall there are no limitations whatsoever on the molecular weight of the copolymers according to the invention, but certain ranges have proven to be indeed advantageous for special intended purposes. If the claimed copolymers are used as flow agents, they should according to the present invention have a molar mass $\overline{M}_n$ of <50,000 g/mol. If the copolymers according to the invention are used as water retention agents, a molar mass $\overline{M}_n$ of >50,000 g/mol has proven to be advantageous and molar masses $\overline{M}_n$ of >80,000 g/mol are particularly suitable.

With regard to the use of the proposed copolymers, the present invention also envisages their combination with modified and/or unmodified polysaccharides where modified celluloses and in this case in particular hydroxyalkylcelluloses with $C_{1-4}$ alkyl residues are regarded as particularly preferred. In this variant of the invention synergistic water retention effects are achieved independent of the molar mass of the copolymers according to the invention which is remarkable in view of the copolymers having an $\overline{M}_n$ of <50,000 g/mol which uniquely exhibit a flow agent effect in this size range within the scope of the invention.

Water-soluble, biologically degradable copolymers are described based on polyamide which contain at least one grafted side chain composed of aldehydes and sulfur-containing acids and salts thereof and optionally at least one compound from the series ketones, aromatic alcohols, urea (derivatives) and amino-s-triazines. In this case natural polyamides such as caseins, gelatins, collagens, bone glues, blood albumins and soya proteins as well as degradation products thereof and synthetic polyamides such as polyaspartic acids and copolymers of aspartic and glutamic acid are used as preferred polyamide components. These copolymers are obtained primarily by graft polymerization at temperatures between −10 and 250° C., preferably in the presence of a solvent such as water or by thermal drying, and they are used in particular as flow agents or water retention agents for inorganic binders and pigments especially in conjunction with hydraulic binders where they retard the setting only to a slight extent.

The following examples illustrate the advantages of the water-soluble and biologically degradable copolymers based on polyamide according to the invention.

EXAMPLES

Examples of Preparation

Example 1

20 g casein was dissolved in 210 g water and 17.5 g sodium sulfite and 16.5 g acetone were added. The reaction solution was then heated to 60° C. and 80 g of a 30% aqueous formaldehyde solution was added dropwise. Subsequently it was stirred for a further 2 h at 70° C. and the pH of the reaction solution was adjusted with formic acid to pH 7.0. The reaction solution was finally concentrated in a vacuum to half its volume in order to remove the methanol formed by the competing Canizarro reaction.

Example 2

240 g gelatin was dissolved in 600 g water and 100 g sodium sulfite and 100 g acetone were added. The reaction solution was heated to 60° C. and 360 g of a 30% aqueous formaldehyde solution was added. Subsequently the reaction solution was stirred for about 2 h at 80° C. and the pH was adjusted to ca. 7.0 with formic acid. The reaction solution was concentrated in a vacuum to half its volume in order to remove the methanol formed by the competing Canizarro reaction.

Example 3

100 g sodium sulfite and 100 g acetone were dissolved in 250 g water. The reaction solution was heated to 60° C. Afterwards 467 g of a 30% aqueous formaldehyde solution was added. Subsequently the reaction solution was stirred for 40 min at 70° C. and 7.26 g sodium pyrosulfite was added to the reaction solution and it was then stirred for a further 30 min. The pH of the reaction solution was adjusted with formic acid to a pH of ca. 7.0. The reaction solution was concentrated in a vacuum to half its volume in order to remove the methanol formed by the competing Canizarro reaction. The reaction solution was diluted with 61 distilled water and 340 g casein was stirred in. The resulting polymer solution was dried which initiated the grafting.

Example 4

100 g soya protein isolate was added to 600 g water. The pH was adjusted to ca. 13 with sodium hydroxide. Subsequently 104 g sodium sulfite and 98 g acetone were added and the reaction mixture was heated to 80° C. 356 g of a 30% formaldehyde solution was added dropwise and the reaction solution was stirred further. The pH of the reaction solution was adjusted with formic acid to pH 7.0. The reaction solution was subsequently concentrated in a vacuum to half its volume in order to remove the methanol formed by the competing Canizarro reaction.

Example 5

15.9 g polyaspartic acid was dissolved in 100 g water. The solution was cooled to about 2° C. Subsequently 34.8 g sodium sulfite and 36.0 g pyrocatechol were added. Then 40.9 g acetaldehyde was added dropwise such that the temperature of the mixture did not exceed 12° C. After addition of the acetaldehyde was completed, the reaction temperature was increased to 75° C. and the reaction solution was stirred at this temperature for a further 2 hours. The solution was cooled to 20° C., adjusted to pH 7.0 with formic acid and concentrated in a vacuum to about half its volume.

Example 6

39.77 g gelatin was added to 100 ml dimethylsulfoxide. Subsequently 17.4 g sodium sulfite and 16.4 g urea were stirred in. The mixture was heated to 60° C. and then 6.9 g of a 40% aqueous glyoxal solution was added. The reaction solution was heated to 75° C. and kept at this reaction temperature for two hours. The dimethyl-sulfoxide was removed under reduced pressure.

Example 7

150 g of a 30% aqueous formaldehyde solution was added first and heated to 30° C. After adding 63 g melamine and 50 g sodium pyrosulfite, 95 g of a 15% sodium hydroxide solution was added. Subsequently the reaction temperature was increased to 75° C., 280 g water was added, the pH was adjusted to ca. 3.0 with sulfuric acid, 79 g of a 40% aqueous solution of polyaspartic acid was added and it was stirred for a further two hours at 75° C. The reaction solution was concentrated at 80° C. under reduced pressure to ca. one third. Afterwards the pH was increased to ca. 7.0 with sodium hydroxide solution.

Examples of Application

Example 8

The plasticizing effect of the copolymers according to the invention on cement slurries containing commercial building cement was determined with the aid of the slump factor. For this 1.5 g polymer was dissolved in 140 g tap water and subsequently 300 g cement (CEM 1 42.5 R) was added. The slurries were allowed to stand for 60 sec and then stirred vigorously for 120 sec. The slurries were poured up to the brim of a Vicat ring (H=40 mm, $d_{small}$=65 mm, $d_{large}$=75 mm) that stood on a glass plate. The Vicat ring was lifted 2 cm and held for about 5 sec over the slurries that flowed out. The diameter of the slurries that had flowed out was measured on two perpendicular axes. The measurement was repeated once. The arithmetic mean of all four measurements gives the slump factor. The following slump factors were obtained:

TABLE 1

| Polymer (according to example) | Slump factor [cm] |
|---|---|
| — | 15 |
| 1 | 24 |
| 2 | 25 |
| 3 | 19 |
| 6 | 22 |

Example 9

The retarding effect of the copolymers according to the invention on the setting properties of salt-containing cement slurries was examined using the following formulation:

792 g cement (CEM I 32.5) was mixed with 1.0% by weight copolymer. 77 g sodium chloride was dissolved in 308 ml water. The cement/copolymer mixture was stirred into the salt water and transferred into an atmospheric consistometer (Chandler Engineering, Tulsa, Cat. No. 12-95-1) at 90° C. The setting time was determined at 90° C. The sodium salt (PAS) of polyaspartic acid was used as a reference (table 2).

TABLE 2

| Polymer (according to example) | Hardening time [h:min] |
|---|---|
| — | 1:05 |
| PAS | >6:00 |
| 2 | 3:07 |
| 3 | 4:30 |
| 7 | 5:10 |

Example 10

The start and end of solidification of the copolymers according to the invention in salt-free cement slurries was determined according to Vicat (DIN EN 196-3). For this 500 g cement (CEM I 42.5 R) was mixed with 210 g tap water and 2.5 g copolymer. The mixture was homogenized and the cement slurries were subsequently measured.

TABLE 3

| Polymer (according to example) | Setting start after [h:min] | Setting end after [h:min] |
|---|---|---|
| — | 6:30 | 7:50 |
| 1 | 7:00 | 11:30 |
| 2 | 7:50 | 11:20 |

Example 11

The plasticizing effect of the copolymers according to the invention in calcium sulfate slurries was determined with the aid of the slump factor. 2 g copolymer was dissolved in 180 g tap water and subsequently 500 g α-semihydrate (CaSO$_4$·0.5 H$_2$O) was added. The slurries were allowed to stand for 60 sec and then vigorously stirred for 45 sec. The slurries were poured up to the brim of a Vicat ring (H=40 mm, $d_{small}$=65 mm, $d_{large}$=75 mm) that stood on a glass plate. The Vicat ring was lifted 2 cm and held for about 5 sec over the slurries that flowed out. The diameter of the slurries that had flowed out was measured on two perpendicular axes. The measurement was repeated once. The arithmetic mean of all four measurements gives the slump factor. A slump factor of 23 cm was obtained for the copolymer of example 1. Without addition of the copolymer the slump factor was 13 cm.

Example 12

The dispersing action of the copolymers according to the invention in salt-containing slurries was investigated as follows:

700 g cement (Joppa Lafarge Class H) was mixed with 0.5% bwoc of the copolymer and subsequently stirred into 364.4 g salt water (27% by weight NaCl). The cement slurries were conditioned for 20 min at 38° C. Subsequently the plasticizing effect of the copolymers according to the invention was determined with the aid of a FANN 35 SA rotation viscometer ($r_{rotor}$=1.8415 cm, $r_{stator}$=1.7245 cm, $h_{stator}$=3.800 cm, $d_{ring\,gap}$=0.1170 cm). The values obtained were compared with those of a slurry without a plasticizing additive (−) and with a slurry containing polyaspartic acid (PAS) (table 4).

TABLE 4

| Polymer (according to example) | Shear stress at $\dot{y} = 511\,s^{-1}$ Pa | Viscosity at $\dot{y} = 511\,s^{-1}$ mPas | Shear stress at $\dot{y} = 10.2\,s^{-1}$ Pa | Viscosity at $\dot{y} = 10.2\,s^{-1}$ mPas |
|---|---|---|---|---|
| — | 38.3 | 75 | 8.7 | 850 |
| PAS | 28.1 | 55 | 3.1 | 300 |
| 1 | 22.0 | 43 | 1.5 | 150 |
| 2 | 22.5 | 44 | 1.0 | 100 |
| 3 | 25.6 | 50 | 2.6 | 250 |
| 5 | 33.2 | 65 | 3.1 | 300 |
| 6 | 25.0 | 49 | 3.1 | 300 |

Example 13

The polymers according to the invention are suitable as water retention agents for plaster pastes. The water retention capacity of the plaster pastes treated with the polymers according to the invention was determined according to DIN 18 555. 350 g α semihydrate was mixed with 210 g tap water, 0.25 g Retardan® (retarder for plasters from the Tricosal Company, Illertissen) and 2.5 g of the copolymer according to example 4 and homogenized. A water retention capacity of 70.9% (blank value 41.5%) was achieved.

Example 14

The polymers according to the invention are suitable as water retention agents for cement slurries. The water retention capacity of the cement slurries treated with the polymers according to the invention was determined according to DIN 18 555. 350 g CEM I 42.5 R cement was mixed with 210 g tap water and 2.5 g of the copolymer according to example 4 and homogenized. The water retention capacity of the cement slurries was 84.6% (blank value 63.8%).

Example 15

The biodegradability of the copolymers according to the invention was determined according to OECD 306. The biodegradabilities after 28 days were determined from the ratio of the biological to theoretical oxygen requirement and compared with the biodegradability of polyaspartic acid (PAS) (table 5).

TABLE 5

| Polymer according to example) | Biological degradability after 28 days in % |
|---|---|
| PAS | 35% |
| 2 | 38% |
| 3 | 42% |

Example 16

The synergistic effect of the copolymers according to the invention together with modified polysaccharides with regard to the water retention capacity was examined using the following cement slurries.

700 g cement (Joppa class H) was mixed with 0.25% by weight hydroxyethylcellulose and 1.0% by weight of the copolymer 2, in each case based on the cement content and subsequently stirred into 266 g water. The cement slurries were conditioned for 20 min at 88° C. The water retention capacity was examined according to API spec. 10 at 70 bar and 88° C. The values obtained were compared with those of the slurries without copolymer or without hydroxyethylcellulose. Whereas a water loss of 350 ml occurred without copolymer and a water loss of 250 ml occurred without hydroxyethylcellulose, the combined use of both polymers resulted in a water loss of only 60 ml.

The invention claimed is:

1. A copolymer comprising at least one grafted side chain comprising an aldehyde component and a sulfur-containing acid component or a salt thereof, wherein the copolymer is water-soluble, biologically degradable, free of aminoplast former, and based on a polyamide.

2. The copolymer as claimed in claim 1, containing the polyamide in an amount of 5 to 80% by weight of the copolymer, the aldehyde component in an amount of 5 to 90% by weight of the copolymer and the sulfur-containing acidic component in an amount of 5 to 60% by weight of the copolymer.

3. The copolymer as claimed in claim 1, wherein the polyamide is a natural polyamide.

4. The copolymer as claimed in claim 3, wherein the natural polyamide is selected from the group consisting of caseins, gelatins, collagens, bone glues, blood albumins and soya proteins.

5. The copolymer as claimed in claim 1, wherein the polyamide is a polyaspartic acid or copolymers of aspartic and glutamic acid and mixtures thereof.

6. The copolymer as claimed in claim 1, comprising a grafted aldehyde based on a member selected from the group consisting of paraforinaldehyde, paraldehyde, an unbranched non-aromatic aldehyde, formaldehyde, acetaldehyde and glyoxal.

7. The copolymer as claimed in claim 1, comprising a grafted aldehyde having from 1 to 5 carbon atoms.

8. The copolymer as claimed in claim 1, comprising formaldehyde, acetaldehyde or glycoxal.

9. The copolymer as claimed in claim 1, containing grafted sulfur-containing acids (salts) based on inorganic sulfur salts.

10. The copolymer according to claim 9, wherein the grafted sulfur containing acid is a sulfite, hydrogen sulfite, or a disulfite of an alkali metal, aluminum, iron or ammonium.

11. The copolymer as claimed in claim 1, wherein the side chain further comprises at least one additional compound selected from the group consisting of a ketone and an aromatic alcohol.

12. The copolymer as claimed in claim 11, wherein the additional compound is present in a proportion of from 5 to 85% by weight.

13. The copolymer as claimed in claim 11, comprising grafted ketones based on a non-aromatic ketone 2-propanone, 2-butanone or pyruvic acid.

14. The copolymer as claimed in claim 11, comprising a grafted aromatic alcohol based on a phenol, a cresol, a catechol or a resorcin.

15. The copolymer as claimed in claim 1, produced by graft polymerization at temperatures between −10 and 250° C.

16. The copolymer of claim 15, wherein the graft polymerization is conducted in the presence of a solvent.

17. The copolymer of claim 16, wherein said solvent is a polar solvent.

18. The copolymer of claim 17, wherein said polar solvent is water is dimethyulsulfoxide.

19. The copolymer of claim 15, wherein said graft polymerization is by thermal treatment.

20. The copolymer of claim 1, wherein the copolymer has a molar mass $\overline{M}_n$ o of <50,000 g/mol.

21. The copolymer as claimed in claim 1, containing the polyamide in an amount of 10 to 60% by weight of the copolymer, the aldehyde component in an amount of from of 10 to 70% by weight of the copolymer and the sulfur-containing acidic component in an amount of 15 to 40% by weight of the copolymer.

22. The copolymer according to claim 1, wherein the polyamide is synthetic or natural.

23. The copolymer according to claim 1, wherein the polyamide is a synthetic polyamide.

* * * * *

UNITED STATES PATENT AND TRADEMARK OFFICE
CERTIFICATE OF CORRECTION

PATENT NO. : 7,612,150 B2
APPLICATION NO. : 10/536596
DATED : November 3, 2009
INVENTOR(S) : Spindler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 703 days.

Signed and Sealed this

Nineteenth Day of October, 2010

David J. Kappos
*Director of the United States Patent and Trademark Office*